United States Patent [19]

Lowe et al.

[11] 4,122,829
[45] Oct. 31, 1978

[54] SOLAR ENERGY COLLECTOR

[76] Inventors: Wallace A. Lowe, P.O. Box 1845, Bradenton, Fla. 33506; Donald E. Robarts, 1311 - 32nd St. West, Brandenton, Fla. 33505

[21] Appl. No.: 704,065

[22] Filed: Jul. 9, 1976

[51] Int. Cl.[2] .............................................. F24J 3/02
[52] U.S. Cl. ..................................... 126/271; 126/270
[58] Field of Search ............... 126/270, 271; 237/1 A; D25/72-74, 77-79

[56] References Cited

U.S. PATENT DOCUMENTS

| 2,277,311 | 3/1942 | Freeman | 126/271 |
| 2,902,028 | 9/1959 | Manly | 126/271 |
| 3,599,626 | 8/1971 | Bouse | 126/271 |
| 3,823,703 | 7/1974 | Lanciault | 126/271 |
| 3,952,725 | 4/1976 | Edmondson | 126/271 |
| 3,974,822 | 8/1976 | Patil | 126/271 |
| 3,994,276 | 11/1976 | Pulver | 126/270 |

Primary Examiner—William F. O'Dea
Assistant Examiner—Larry Jones
Attorney, Agent, or Firm—Arthur W. Fisher, III

[57] ABSTRACT

A solar energy collector for heating liquids such as water through absorption of the sun's energy. The solar energy collector comprising an enclosure structured to operatively house at least a pair of serpentine fluid conduits disposed in substantially parallel relationship relative to each other. The enclosure comprises a frame configured to operatively support a substantially transparent medium in parallel spaced relation relative to the pair of serpentine fluid conduits to intensify the sun's rays and a reflective back member in parallel spaced relation relative to the pair of serpentine fluid conduits on the opposite side from the substantially transparent medium.

6 Claims, 3 Drawing Figures

SOLAR ENERGY COLLECTOR

BACKGROUND OF THE INVENTION

1. Field of the Invention

A solar energy collector for heating liquids such as water through absorption of the sun's energy.

2. Description of the Prior Art

Over the years numerous efforts have been made to harness solar energy into a useful state. Such efforts include converting solar energy into heating systems through solar stoves, furnaces and the like. Unfortunately many are typified by extremely large collector plates and large storage tanks for storing the liquid heated by collector plates. Unfortunately due to inefficiences there is an excessive heat loss when transferring the solar heat from the collector to the storage tank. Furthermore, due to size, these systems have not been capable of being easily installed in existing building structures.

Generally solar energy collectors intercept sunlight perpendicular to the direction of the sun. To enhance energy absorption elaborate systems have been devised to track the sun by changing position during the day. This requires a driving mechanism which makes the construction expensive with attendant operational malfunctions. Flat-plate collectors, on the other hand, have not in the past generally produced high enough temperatures, to be useful for the more desirable applications.

Another form of collector comprises a shallow chamber having the interior surface with a black coating, to absorb the sunlight passing through a transparent wall or cover. The conventional plate collector employs a transparent fluid such as air to be circulated through the chamber to transfer heat. The transparent cover reduced the loss of heat by radiation and convection. Thus the temperature of the fluid is raised as it traverses the collector.

As expected the high temperature prevailing at the black interior surface of the collector results in appreciable loss of heat by conduction through the back or bottom of the collector chamber despite the insulation. As a result it has not been possible to heat the air stream traversing a collector to nearly as high a temperature for any given flow rate per unit area as would be theoretically possible.

It is thus apparent that prior efforts have failed to combine the necessary structural elements to provide a highly efficient yet relatively inexpensive solar collector.

SUMMARY OF THE INVENTION

The present invention relates to a solar energy collector. More specifically the solar energy collector comprises an enclosure structured to operatively house at least a pair of serpentine fluid conduits disposed in substantially parallel relation to each other.

The enclosure comprises a frame including an inner and outer frame member extending about the periphery of the solar collector to support the serpentine fluid conduits in parallel spaced relationship relative to a substantially transparent medium comprises magnifying pane having an inner smooth surface and an outer irregular surface to intercept the sun's rays. Disposed between the serpentine fluid conduits and the reflective back member is a substantially rigid water proof insulation means. Alternately the insulator means may comprise foam glass insulation or the like.

In operation, the solar collector is coupled to an external fluid storage tank or reservoir by means of a pump. When mounted to receive the sun's rays, fluid is pumped through the serpentine conduit. The combination of the substantially transparent medium and reflective back member raise the temperature significantly within the air space or heat transfer chamber to heat the fluid as it passes through the serpentine conduits. Through the use of the parallel conduits it is possible to provide over thirty five square feet of heat transfer surfaces within a thirty four square solar collector. Thus an essentially simple, efficient collect is provided.

The invention accordingly comprises the features of construction, combination of elements, the arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
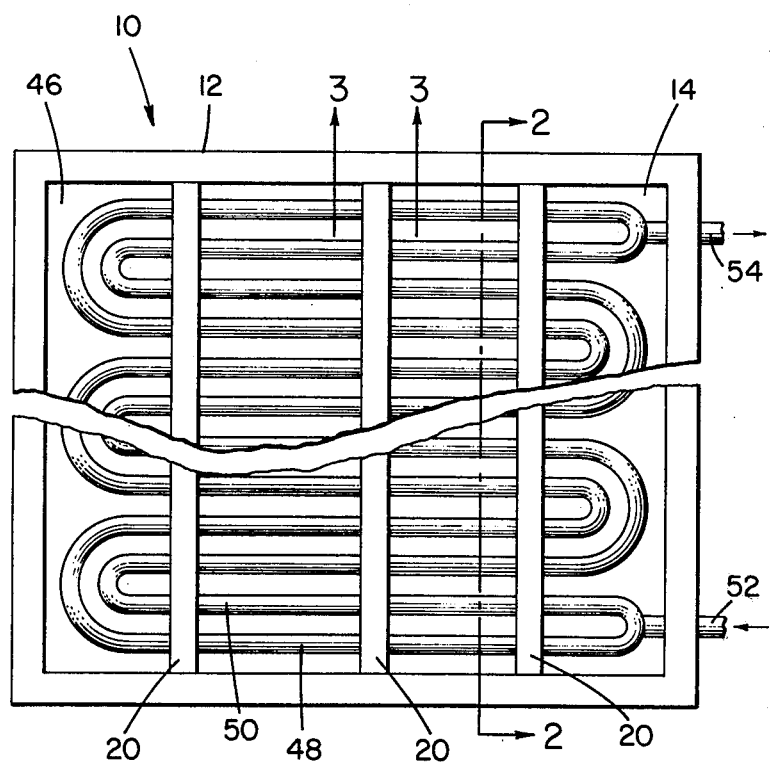
FIG. 1 is a top view of a solar collector.
Figure 2:
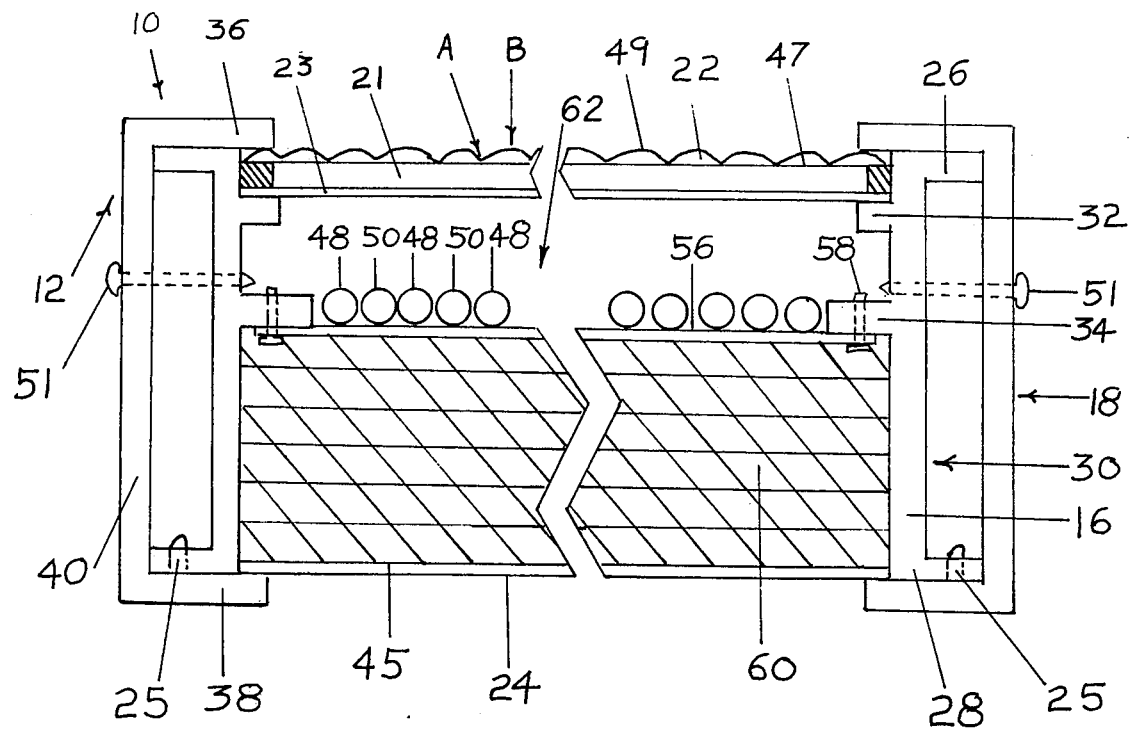
FIG. 2 is a a cross-sectional end view of the solar collector taken along line 2 — 2 of FIG. 1.

As shown in FIGS. 1 and 2 the present invention relates to a solar collector generally indicated as 10. As described more fully hereinafter, the solar collector 10 comprises an enclosure generally indicated as 12 configured to operatively house a fluid conduit means generally indicated as 14.

Figure 3:
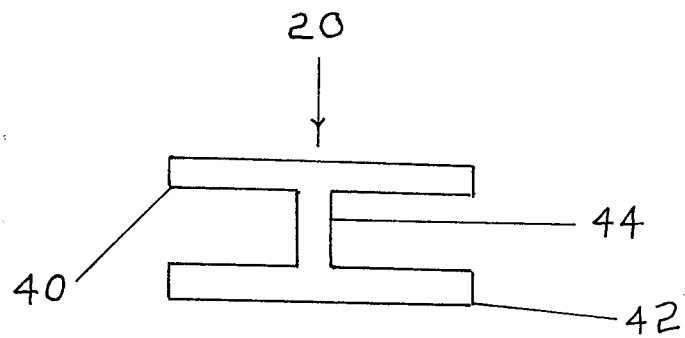
FIG. 3 is a cross-sectional end view of intermediate cross member taken along line 3 — 3 of FIG. 1.

As shown the enclosure 12 comprises a frame including an inner and outer frame members 16 and 18 respectively together with a plurality of intermediate members 20. The enclosure 12 further includes a substantially transparent medium 22 and reflective back member 24 held in substantially parallel relationship by the frame members 16, 18 and 20 as more fully described hereinafter. It should be noted that outside frame 18 is secured to inner frame 16 by fastening means 51. The inner member 16 comprises upper and lower substantially parallel coupling elements 26 and 28 respectively disposed in spaced relation relative to each other on the outside of interconnecting element 30. Disposed on the opposite side or inside of the interconnecting element 30 are upper and lower substantially parallel support elements 32 and 34 respectively in spaced relation relative to each other. It should be noted that the lower support element 34 extends inwardly substantially further than the upper support element 32. The outer frame member 18 comprises upper and lower substantially parallel coupling elements 36 and 38 respectively disposed in spaced relation relative to each other on interconnecting element 40. As best shown in FIG. 2, the relative distance between the upper and lower elements 36 and 38 is sufficiently greater than the distance between the upper and lower elements 26 and 28 to permit the intermediate member 20 and the substantially transparent medium 22 to be press fitted between the upper support element 32 and the upper element 26 when the solar collector 10 is operatively assembled. Element 21 is a dead air space between the substantially transparent medium 22 and a second medium 23 thus forming a transparent thermo-pane. As best shown in FIG. 3 each of the plurality of intermediate members 20 comprises upper and lower elements 40 and 42 respectively held in fixed spaced substantially parallel relation relative to each other by interconnecting element 44.

The substantially transparent medium 22 comprises a plurality of magnifying panes each indicated at 46. Each magnifying pane 46 comprises smooth inner surface 47 and a beaded or ridged outer surface 49 disposed to uniquely intercept the sun's rays at angles inclined A as well as perpendicular B thereto. Thus the sun's rays are effectively absorbed by the solar collector 10 during the early and late day light hours as well as during mid-day. It should be noted that the spacing between upper and lower elements 40 and 42 is such as to receive the edge of the panes 46 securely interconnect adjacent panes 46. The reflective back member 24 is secured to inner support 28 by fastening means 25. The reflective back member 24 may comprise any silver coating or the like on the inner surface 45 thereof.

Alternately, the panes 46 may be reversed with the beaded or rough surface 49 facing inwardly to trap the sun's rays once in the heat transfer chamber 62. It should be noted that the rough surface is greatly preferred to permit tempering.

As best shown in FIG. 1, the fluid conduit means 14 comprises at least a pair of serpentine fluid conduits 48 and 50 disposed in substantially parallel relation relative to each other. The serpentine fluid conduits 48 and 50 are coupled to an external fluid storage tank or reservoir by means of a pump (neither shown) through inlet and outlet ports 52 and 54 respectively. The parallel circuiting of the serpentine fluid conduits 48 and 50 reduce the radius of curvature to minimize friction and flow pressures while maximizing the area of heat transfer surface. The serpentine fluid conduits 48 and 50 (circular in cross-section) are operatively supported by a plurality of support members 56 securely attached to lower support member 34 by fastening means 58. Further the serpentine fluid conduits 48 and 50 are coated with a non-reflective coating to enhance heat transfer.

Disposed between the support members 56 and the reflective back member 24 is a substantially rigid waterproof insulation means 60. Of course, the insulation means 60 may comprise foam glass insulation or the like. A heat transfer chamber 62 is thus cooperatively formed between the transparent medium 22 and the insulation means 60.

In operation, the solar collector 10 is coupled to an external fluid storage tank or reservoir (not shown) by means of a pump (not shown) through parts 51 and 54. When mounted to receive the sun's rays A and B, fluid is pumped through the serpentine fluid conduit 48 and 50. The combination of the substantially transparent medium 22 and reflective back member 24 raise the temperature significantly within the heat transfer chamber 62 to heat the fluid as it passed through the serpentine fluid conduits 48 and 50. Through the use of the parallel conduits it is possible to provide over 35 square feet of heat transfer surfaces within a 34 square foot solar collector. As a result it is possible to generate a flow rate of up to 8 gallons per minute in contrast to 3 to 4 gallons per minute typically expected. Thus the essentially simple, highly efficient collector is provided.

It will thus be seen that the aspects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described, what is claimed is:

1. A solar energy collector for heating fluids such as water from an external source through absorption of the sun's energy: said solar energy collector comprises an enclosure structured to operatively house a fluid conduit means, said fluid conduit means including an inlet and outlet port to couple said solar energy collector to the external source to circulate fluid between said fluid conduit means and the external source, said enclosure comprising a back member and 9 substantially transparent medium held in fixed spaces relation relative to each other by a frame, said frame comprises inner perimeter frame members disposed on opposite sides of said frame, each said inner frame member comprising an upper and lower coupling element held in fixed spaced relation relative to each other by an interconnecting element and upper and lower support elements held in fixed spaced relation relative to each other by said interconnecting element, and outer frame members disposed on opposite sides of said frame, each of said outer frame members comprising an upper and lower coupling element held in fixed spaced relation relative to each other by an interconnecting element, said lower coupling element of said outer frame member being disposed to operatively support said back member, said upper and lower coupling elements of said inner frame member disposed to engage said corresponding upper and lower coupling elements of said outer frame member to cooperatively form said frame, said upper support element of said outer frame members being disposed relative to said corresponding upper coupling element of said outer frame member to secure said substantially transparent medium therebetween, said solar energy collector further including a support element coupled between said lower coupling elements to operatively support said fluid conduit means, said fluid conduit means being disposed in a heat exchange chamber cooperatively formed between said back member and said substantially transparent medium to intercept the sun's energy to raise the temperature within said heat exchange chamber to heat the fluid within said fluid conduit means to be fed to the external source.

2. The solar energy collector of claim 1 further including an insulation means disposed between said back member and said fluid conduit means.

3. The solar energy collector of claim 2 wherein said back member and said insulation means are secured between said lower coupling element of said outer member and said fluid conduit means.

4. The solar energy collector of claim 2 wherein said insulation means comprises a substantially rigid waterproof insulation means.

5. The solar energy collector of claim 1 wherein said back member comprises a reflective inner surface.

6. The solar energy collector of claim 1 wherein said fluid conduit means includes a non-reflective, energy absorbing surface.

* * * * *